US012729736B2

(12) United States Patent
Cole, Jr. et al.

(10) Patent No.: US 12,729,736 B2
(45) Date of Patent: Sep. 8, 2026

(54) COMPACT MULTI-FUNCTION CLUTCH

(71) Applicant: PT Tech, LLC, Wadsworth, OH (US)

(72) Inventors: Richard E. Cole, Jr., Medina, OH (US); Daniel Wilkerson, Copley, OH (US); Brett Carpenter, Birmingham, MI (US)

(73) Assignee: PT Tech, LLC, Wadsworth, OH (US)

( * ) Notice: Subject to any disclaimer, the term of this patent is extended or adjusted under 35 U.S.C. 154(b) by 0 days.

(21) Appl. No.: 18/985,718

(22) Filed: Dec. 18, 2024

(65) Prior Publication Data

US 2026/0168550 A1 Jun. 18, 2026

(51) Int. Cl.

*F16D 67/04* (2006.01)
*F16D 25/0638* (2006.01)
*F16D 121/04* (2012.01)

(52) U.S. Cl.

CPC ......... *F16D 67/04* (2013.01); *F16D 25/0638* (2013.01); *F16D 2121/04* (2013.01)

(58) Field of Classification Search

CPC .. F16D 67/04; F16F 15/1208; F16F 15/13164
See application file for complete search history.

(56) References Cited

U.S. PATENT DOCUMENTS 3,805,931 A 4/1974 Portmann
4,785,926 A * 11/1988 Matson .................. B30B 15/10 192/48.612
4,926,989 A * 5/1990 Bruntz .................... F16D 67/04 192/85.49
5,499,703 A * 3/1996 Kii .................... F16F 15/13121 192/70.11
5,901,825 A * 5/1999 Uenohara ........... F16F 15/1203 192/70.13
5,992,593 A * 11/1999 Yamamoto ........ F16F 15/13164 192/48.1
6,508,336 B1 * 1/2003 El-Kassouf ............. F16D 67/04 188/72.3
6,637,568 B2 10/2003 Latsko
7,195,111 B2 * 3/2007 Fukushima ........... F16F 15/139 192/214.1

(Continued)

OTHER PUBLICATIONS

International Search Report and Written Opinion for Application No. PCT/US2025/059136 dated May 6, 2026 (13 pages).

*Primary Examiner* — Stacey A Fluhart
(74) *Attorney, Agent, or Firm* — Michael Best & Friedrich LLP

(57) ABSTRACT

A clutch includes a clutch fluid chamber with a movable clutch piston configured to selectively engage a clutch pack to connect an input drive portion and an output portion. A brake reaction plate is configured for selective frictional braking of the output portion. A brake fluid chamber contains a brake piston configured to selectively move the brake reaction plate from a disabled position to an enabled position. In a first state, the clutch pack is disengaged and the brake reaction plate is in the disabled position. In a second state, the clutch pack is engaged and the brake reaction plate is in the enabled position, without frictional braking of the output portion of the clutch being applied. In a third state, the clutch pack is disengaged and the brake reaction plate is in the enabled position such that frictional braking of the output portion is applied.

18 Claims, 12 Drawing Sheets

(56) References Cited

U.S. PATENT DOCUMENTS

| | | | | |
|---|---|---|---|---|
| 7,341,134 | B2 | 3/2008 | Buhrke | |
| 2003/0183471 | A1 * | 10/2003 | Gochenour | F16D 27/115 192/55.61 |

* cited by examiner

COMPACT MULTI-FUNCTION CLUTCH

BACKGROUND OF THE DISCLOSURE

The present disclosure relates to clutches. More particularly, the present disclosure relates to clutches for industrial work machines.

SUMMARY OF THE DISCLOSURE

The present disclosure provides, in one aspect, a clutch including a housing, an input drive portion, and an output portion configured for selective connection to the input drive portion through a clutch pack for mutual rotation about a central axis. A clutch actuation fluid chamber in the housing contains a movable clutch piston configured to selectively engage the clutch pack to connect the input drive portion and the output portion. A brake reaction plate is provided within the housing and configured for selective frictional braking of the output portion of the clutch. A brake enable fluid chamber in the housing contains a movable brake piston configured to selectively move the brake reaction plate from a disabled position to an enabled position. The clutch has a first state in which the clutch pack is disengaged and the brake reaction plate is in the disabled position such that frictional braking of the output portion of the clutch is not applied. The clutch has a second state in which the clutch pack is engaged and the brake reaction plate is in the enabled position, without frictional braking of the output portion of the clutch being applied. The clutch has a third state in which the clutch pack is disengaged and the brake reaction plate is in the enabled position such that frictional braking of the output portion of the clutch is applied.

The present disclosure provides, in another aspect, a clutch including a housing and an output shaft rotatably supported within the housing. An input drive portion of the clutch is configured for selective connection to the output shaft through a clutch pack for mutual rotation about a central axis. The input drive portion includes a friction disc and a torsional coupling configured to damp torque impulses and drive the friction disc. A bearing supports the input drive portion, including the torsional coupling, on the output shaft. The torsional coupling of the input drive portion and the bearing lie in a shared reference plane that extends perpendicular to the central axis.

The present disclosure provides, in yet another aspect, a clutch including an end plate, a housing, and a clutch actuation fluid chamber in the housing containing a movable clutch piston. A pressure plate is movable between a release position and an engaged position, the pressure plate having a clutching surface and a braking surface opposite the clutching surface. The pressure plate is secured for rotation about a central axis with the end plate and an output shaft. A friction disc is positioned between the end plate and the clutching surface of the pressure plate and selectively clamped therebetween to engage the clutch. The pressure plate is urged by a first bias member away from the end plate and the friction disc to the release position, and the pressure plate is configured for selective actuation to the engaged position in which the bias member is overcome in response to fluid pressure on the clutch piston. A brake reaction plate is positioned adjacent the braking surface of the pressure plate, the brake reaction plate having an enabled position and a disabled position, the brake reaction plate being biased by a second bias member to the disabled position. In the enabled position, the brake reaction plate is positioned to selectively receive the braking surface of the pressure plate in its release position to apply braking force configured to stop rotation of the pressure plate, the end plate, and the output shaft. In the disabled position, the brake reaction plate is positioned away from the braking surface of the pressure plate in its release position to avoid applying braking force to the pressure plate.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
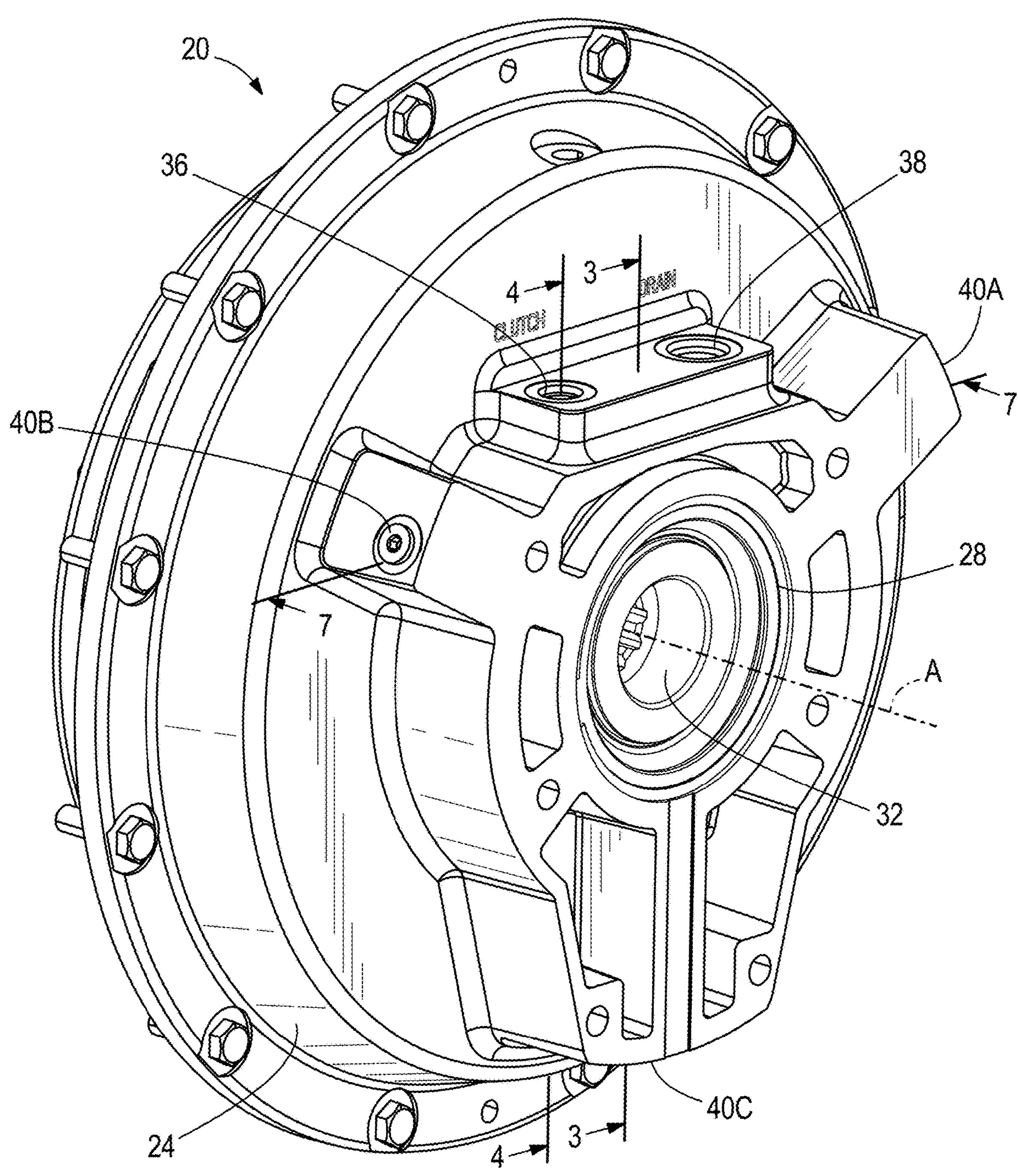
FIG. 1 is a first perspective view of a clutch according to one embodiment of the present disclosure, showing the output end.
Figure 2:
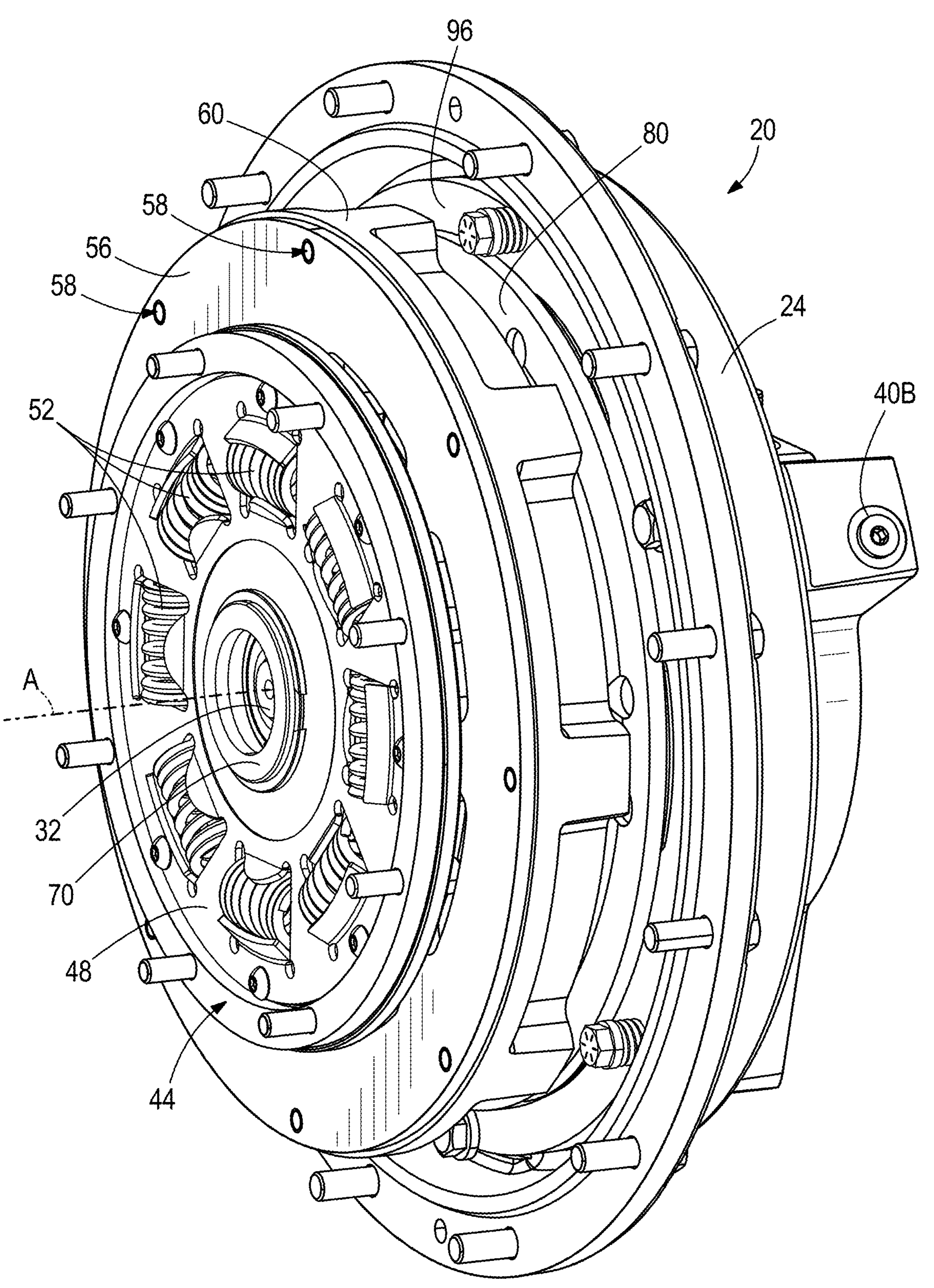
FIG. 2 is a second perspective view of a clutch according to one embodiment of the present disclosure, showing the input end.

FIGS. 1 and 2 illustrate a clutch 20 according to one construction of the present disclosure. The clutch 20 is a dry clutch selectively actuatable between a disengaged or released state that does not transmit torque between input and output portions of the clutch, and an engaged state for torque transmission between the input and output portions.

The clutch 20 is switchable between the disengaged and engaged states by hydraulic actuation, as detailed further below. The clutch 20 includes an integrated switchable brake that selectively applies brake force against rotation of the output portion of the clutch. The brake is switchable between two states by hydraulic actuation. As will become more apparent from the following description, the brake is not directly switchable between disengaged and engaged states, as the engagement of the brake is further dependent on the clutch 20 being in the disengaged state.

As shown in FIG. 1 from an output side, the clutch 20 includes a bellhousing 24. The bellhousing 24 can include a peripheral flange with a plurality of fastener openings for bolting to an adjacent structure. The illustrated bellhousing 24 is just one optional construction for a housing within the context of the overall disclosure. It should be understood that, while the following description refers to the illustrated bellhousing 24, features of the clutch 20 can be used in other applications where there is no "bellhousing" per se, and the housing may be provided in an alternate manner. For example, the housing for the clutch 20 can include a housing of an adjacent gearbox having internal components selectively driven from the clutch. Along a central axis A, the bellhousing 24 includes an opening 28. The opening 28 receives an output shaft 32. The output shaft 32 is configured to be driven for rotation, through the clutch, by an upstream prime mover such as an internal combustion engine. The bellhousing 24 includes a plurality of fluid ports. Among the fluid ports are a clutch port 36, a drain port 38, and at least one brake port 40A, 40B, 40C. In the illustrated construction, one brake port 40A is configured for connection with a controllable supply of pressurized hydraulic fluid. The remaining brake port(s) 40B, 40C are plugged. However, any of the brake ports 40A, 40B, 40C may be configured for connection with a controllable supply of pressurized hydraulic fluid in other constructions. All the brake ports 40A, 40B, 40C are interconnected internally. By providing the brake ports 40A, 40B, 40C in a dispersed arrangement on the bellhousing 24, they provide for easily adapting to various customer requirements for making hydraulic connections, as the clutch 20 may be used in a wide variety of industrial applications. The plurality of brake ports 40A, 40B, 40C are oriented generally radially in separate directions from the central axis (e.g., spaced at even angular intervals). The plurality of brake ports 40A, 40B, 40C may also be described as being located on different sides of the bellhousing 24.

The input side of the clutch 20 is shown in FIG. 2. The input side includes an input drive portion 44 configured to couple to and be rotated by the upstream prime mover. The input drive portion 44 can be configured to rotate directly with an output of the upstream prime mover. The input drive portion 44 may be configured to rotate at all times that the output of the upstream prime mover rotates. In other words, the input drive portion 44 may be rotated, regardless of the clutch's engaged/disengaged state. Although the input drive portion 44 of the clutch 20 can take many different forms, the illustrated example includes a torsional coupling 48 or "torque damping coupling" configured to provide a prescribed amount of input torque damping. The torsional coupling 48 can be constructed according to known means of multiple plates or rings, provided for limited relative rotation, one of which drives another through one or more elastic members such as coil springs 52. The elastic members 52 may exhibit minimal deflection at steady state, but offer the capability of absorbing irregularities or pulses in input torque (e.g., from the firing order of an internal combustion engine). The torsional coupling 48 can operate bidirectionally. The torsional coupling 48 operates to damp torque pulses and transmit a smoothed torque profile. As known in the art, torsional couplings also shift the system natural frequencies of the rotor-dynamic system as compared to a similar system with no torsional coupling. The selected stiffness of the torsional coupling 48 determines where resonance conditions present themselves within an operating speed range. This purpose of the torsional coupling 48 can be advantageous to tuning a given powertrain for extended life of componentry. The illustrated torsional coupling 48 includes an output member or output plate 56 that is driven through the elastic members 52. The output member 56 is secured (e.g., with a plurality of threaded fasteners 58) to a drive ring 60 to rotate the drive ring 60. The drive ring 60 is secured with a friction disc 62 to rotate the friction disc 62. The friction disc 62 represents the output or end of the input drive portion 44. In the illustrated construction, the drive ring 60 is secured to the friction disc 62 via inter-meshed teeth 64, 66 (e.g., inward facing teeth 64 on the drive ring 60 and outward facing teeth 66 on the friction disc 62).

Figure 3:
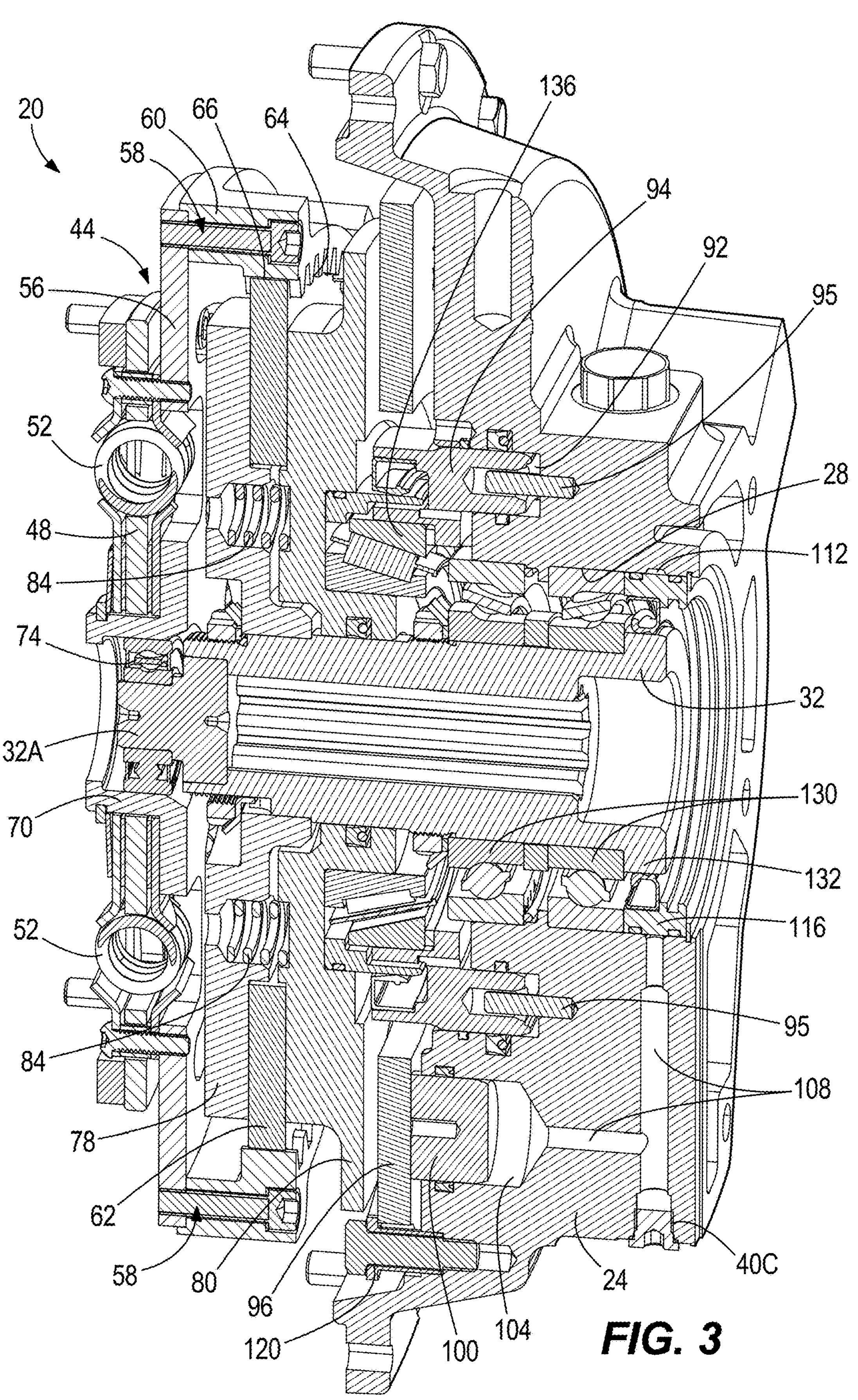
FIG. 3 is a cross-section view of the clutch, taken along line 3-3 of FIG. 1.
Figure 5:
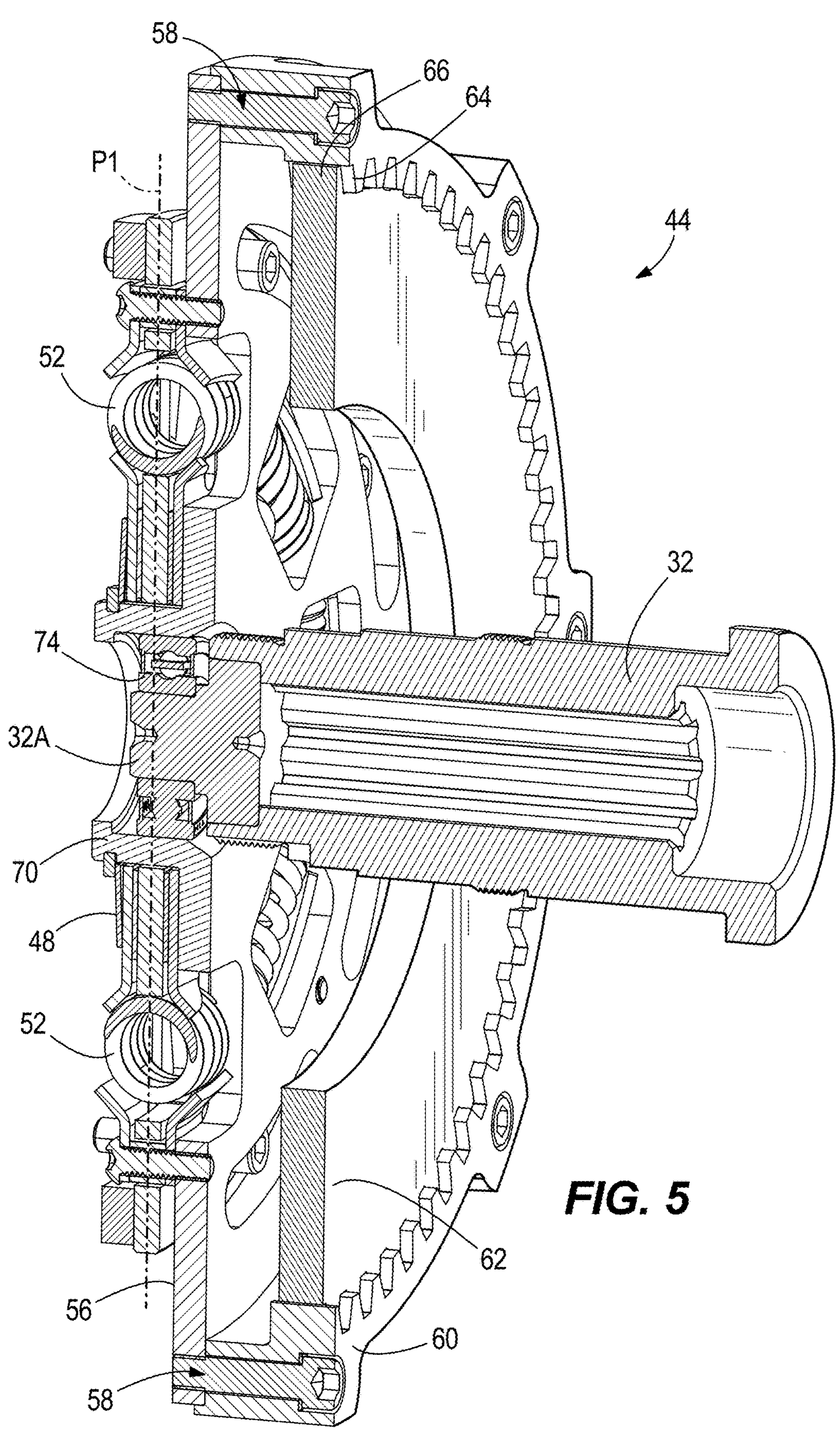
FIG. 5 is a cross-section view of an input drive portion of the clutch, including a torque damping coupling and a friction disc. The clutch output shaft is also shown.

The output member 56 of the torsional coupling 48 includes a central axially extending portion or "stub" 70. The remainder of the torsional coupling 48 is supported on an outside of the output member stub 70. The stub 70 is hollow. As shown in FIG. 3, the clutch output shaft 32 has an end portion 32A that supports the torsional coupling 48 via a bearing 74 (e.g., rolling element bearing such as a ball bearing). The torsional coupling 48 and the bearing 74 lie in a shared reference plane P1 (FIG. 5) that extends perpendicular to the central axis A. By overlapping these components in the axial direction, the clutch 20 achieves a reduced axial packaging size. In the illustrated construction, the end portion 32A is formed separately from a main portion of the output shaft 32. The main portion of the output shaft 32 is hollow, and the interior thereof may be splined or otherwise configured for torque transmission to a further shaft that is selectively powered through the clutch 20.

Figure 4:
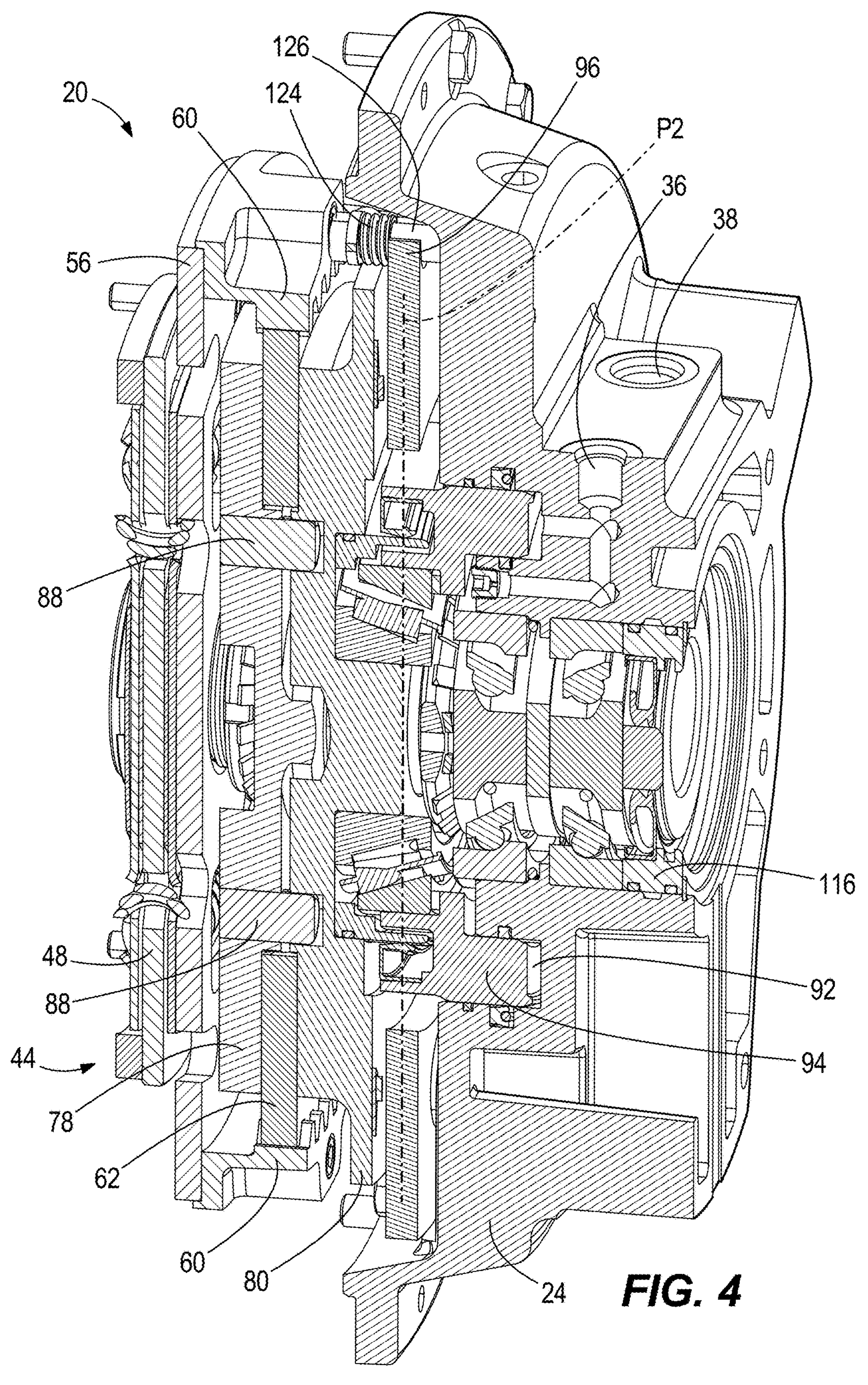
FIG. 4 is a cross-section view of the clutch, taken along line 4-4 of FIG. 1.

The friction disc 62 is situated axially between an end plate 78 and a pressure plate 80 of the clutch 20. The friction disc 62 is selectively sandwiched between the end plate 78 and the pressure plate 80. One or more biasing members (e.g., coil spring(s)) 84 urge the end plate 78 and the pressure plate 80 away from each other to reduce or eliminate clamp load on the friction disc 62. The friction disc 62 being unclamped by the end plate 78 and the pressure plate 80 corresponds to the disengaged or released state of the clutch 20. The friction disc 62 being clamped by the end plate 78 and the pressure plate 80 to rotate therewith corresponds to the engaged or torque transmitting state of the clutch 20. The end plate 78 is locked for rotation with the output shaft 32, for example by a key or spline. The end plate 78 and the pressure plate 80 are locked for rotation, whether or not the clamp the friction disc 62, by a set of guide pins 88 (FIG. 4). The guide pins 88 can be formed separately from the end plate 78 and the pressure plate 80 and engaged with corresponding recesses or apertures therein. In other constructions, the guide pins 88 may be formed integrally with the end plate 78 or the pressure plate 80. The clutch 20 is a dry clutch in which the clutch pack formed by the end plate 78, the friction disc 62, and the pressure plate 80 are not bathed in oil. As such, the clutch pack is not sealed within the bellhousing 24. In the illustrated construction, the clutch pack is exclusively formed by the end plate 78, the friction disc 62, and the pressure plate 80.

The clutch 20 is biased to the disengaged or released state by the biasing members 84, which may also be referred to as "clutch springs." The clutch 20 is hydraulic actuation to overcome the clutch springs 84 and clamp the friction disc 62 between the end plate 78 and the pressure plate 80 (i.e., transition the clutch pack from released state to engaged state). The clutch pack is configured to provide a degree of slip, depending upon the clutch actuation force (i.e., the clutch 20 is not of the type that is exclusively binary in its operation). Clutch actuation force is provided selectively by hydraulic fluid pressure incident in a clutch actuation fluid chamber 92 in the bellhousing 24 containing a movable clutch piston 94. In response to the hydraulic fluid pressure in the clutch actuation fluid chamber 92, the pressure plate 80 is movable between a release position (FIGS. 9 and 11) in which the pressure plate 80 does not engage the friction disc 62 and an engaged position (FIG. 10) in which the pressure plate 80 engages the friction disc 62. As shown in FIG. 3, the clutch piston 94 can float in an axially movable manner on seals retained in the bellhousing 24. Additionally, stays 95 such as posts or pins are secured to an interior side of the bellhousing 24 and received within corresponding receptacles in the clutch piston 94. In the illustrated construction, the clutch piston 94 is engaged by two diametrically opposed stays 95. The stays 95 resists bearing drag and fix a rotational orientation of the clutch piston 94 with respect to the bellhousing 24.

Adjacent the pressure plate 80, the clutch 20 includes a brake reaction plate 96 positioned adjacent the pressure plate 80. As described in further detail below, the brake reaction plate 96 can selectively apply braking force to the pressure plate 80 (and thus, the end plate 78 and the output shaft 32). Whereas the friction disc 62 faces and selectively engages a clutching surface of the pressure plate 80, the brake reaction plate 96 faces and selectively engages a braking surface of the pressure plate 80, the braking surface arranged opposite the clutching surface. Thus, when the pressure plate 80 moves away from the friction disc 62 by the clutch springs 84, it moves toward the brake reaction plate 96. The brake reaction plate 96 has an enabled position and a disabled position. In the disabled position of the brake reaction plate 96 (FIG. 9), the braking surface of the pressure plate 80 will not establish contact with the brake reaction plate 96, even when the pressure plate 80 is urged to the released position by the clutch springs 84. In the enabled position of the brake reaction plate 96 (FIGS. 10 and 11), the braking surface of the pressure plate 80 selectively establishes contact with the brake reaction plate 96, depending on the engaged/disengaged position of the pressure plate 80. The braking surface of the pressure plate 80 can be formed integrally, by a separate plate secured to the pressure plate 80, or by a plurality of individual friction pads 98 secured to the pressure plate 80. The friction pads 98 are shown in phantom in FIG. 6 (without the pressure plate 80) against the brake reaction plate 96. In other constructions, a plurality of friction buttons are provided on the pressure plate 80 for establishing contact with the brake reaction plate 96. The brake reaction plate 96 and the clutch piston 94 lie in a shared reference plane P2 that extends perpendicular to the central axis A. The shared reference plane P2 can occur in at least one state of the clutch 20, and optionally multiple states of the clutch 20.

Figure 7:
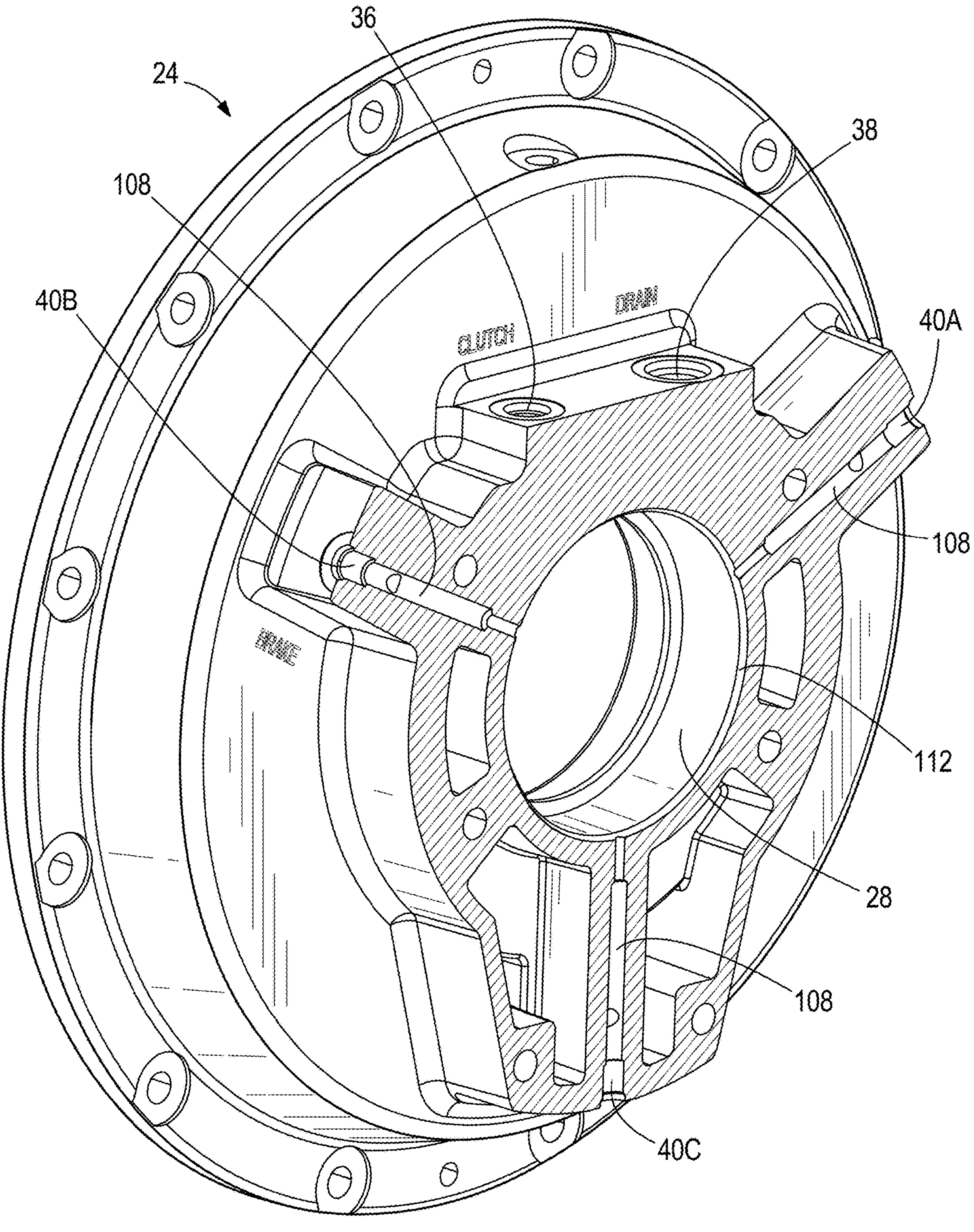
FIG. 7 is a cross-section view taken through a bellhousing of the clutch, transverse to a central axis of the clutch.
Figure 8:
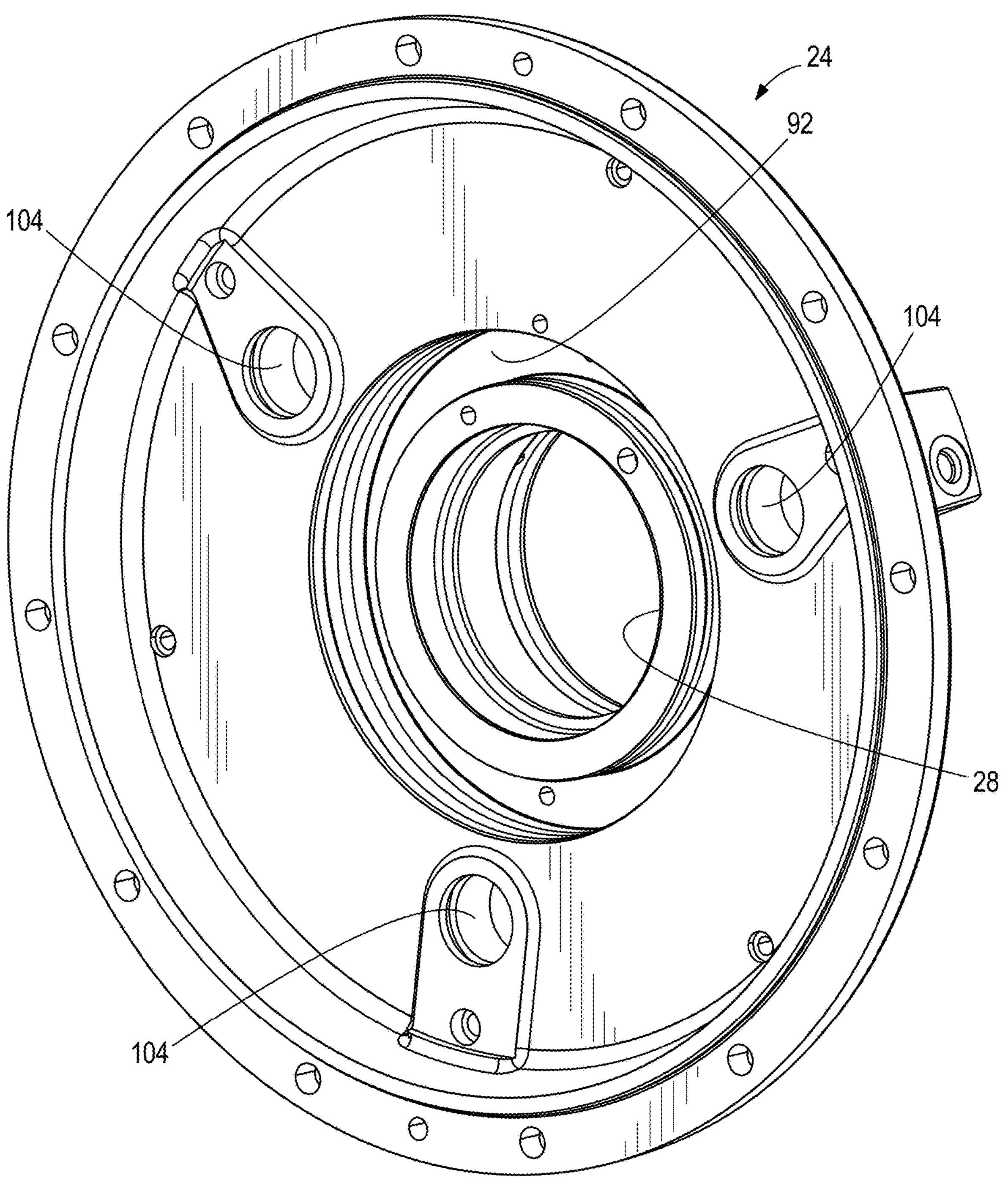
FIG. 8 is a perspective view of an interior of the bellhousing.

The brake reaction plate 96 is movable from the disabled position to the enabled position by one or more brake pistons 100 under the influence of hydraulic fluid pressure in one or more brake enable fluid chambers 104 in the bellhousing 24 (FIGS. 3 and 8). In the illustrated construction, the bellhousing 24 includes a plurality of (e.g., three) brake enable fluid chambers 104 housing a corresponding plurality of brake pistons 100. The plurality of brake enable fluid chambers 104 corresponds to the plurality of brake ports 40A, 40B, 40C on the outside of the bellhousing 24. As shown in FIG. 3, respective fluid connection ports 108 connect the brake enable fluid chambers 104 with one of the brake ports 40A, 40B, 40C. Further, all the respective fluid connection ports 108 are interconnected with each other via a passage 112 (FIGS. 3 and 7). The passage 112 configures all the brake enable fluid chambers 104 and their respective brake pistons 100 in fluid parallel with each other. The passage 112 is a central annular channel formed along the central bellhousing opening 28. The central annular passage 112 connecting the brake ports 108 can be enclosed by a seal cover 116. As shown in FIG. 3, the seal cover 116 can be positioned adjacent an outer end of the bellhousing 24, which forms the output end of the clutch 20 as shown.

Figure 6:
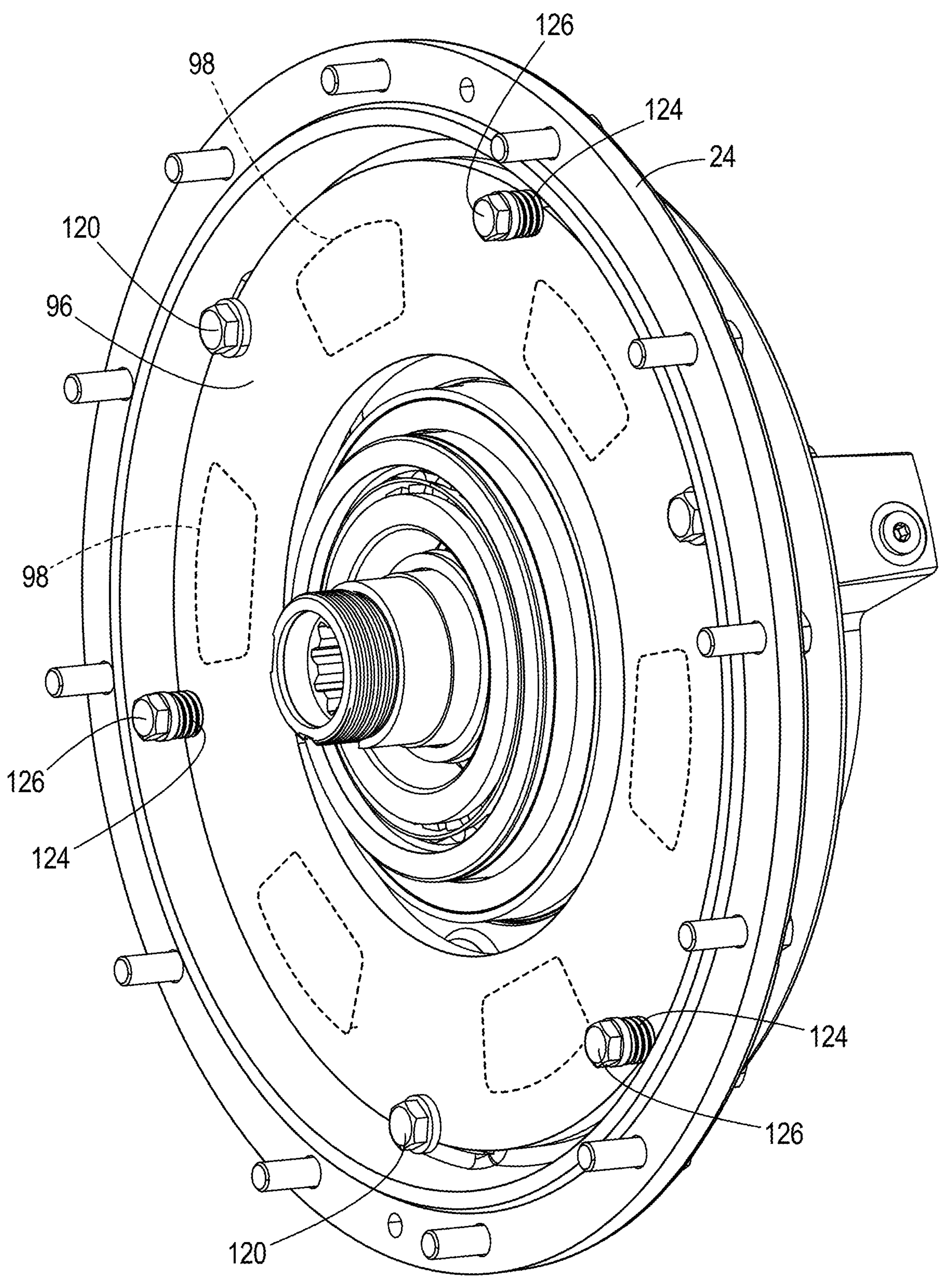
FIG. 6 is a perspective view of the clutch with the input drive portion and pressure plate removed to show a brake reaction plate.
Figure 10:
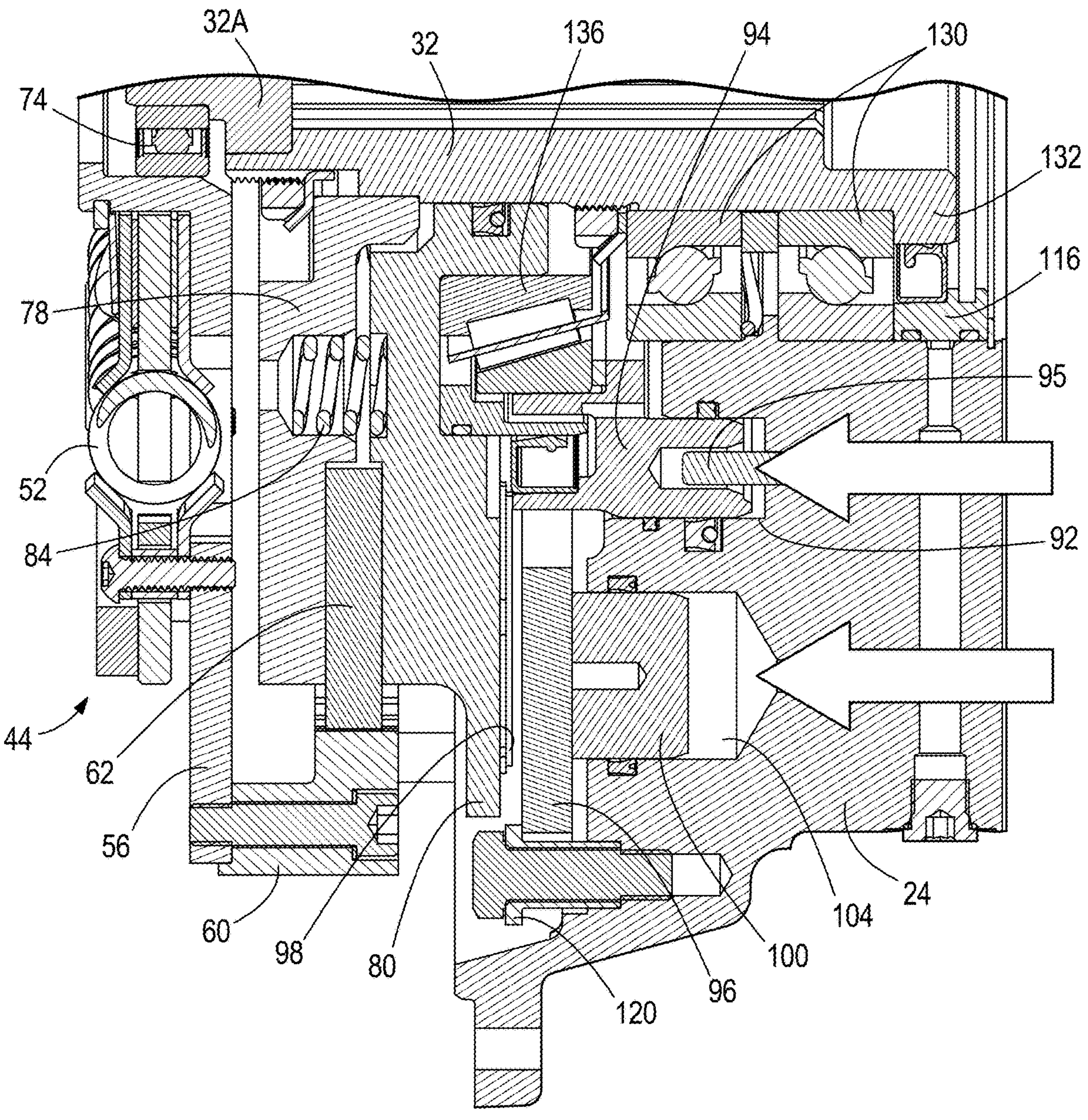
FIG. 10 is a detail view of the cross-section of the clutch, showing a second state in which the clutch is engaged. The pressure plate is in an engaged position, in contact with the friction disc. Although the brake reaction plate is in an enabled position, the pressure plate is spaced from the brake reaction plate.
Figure 11:
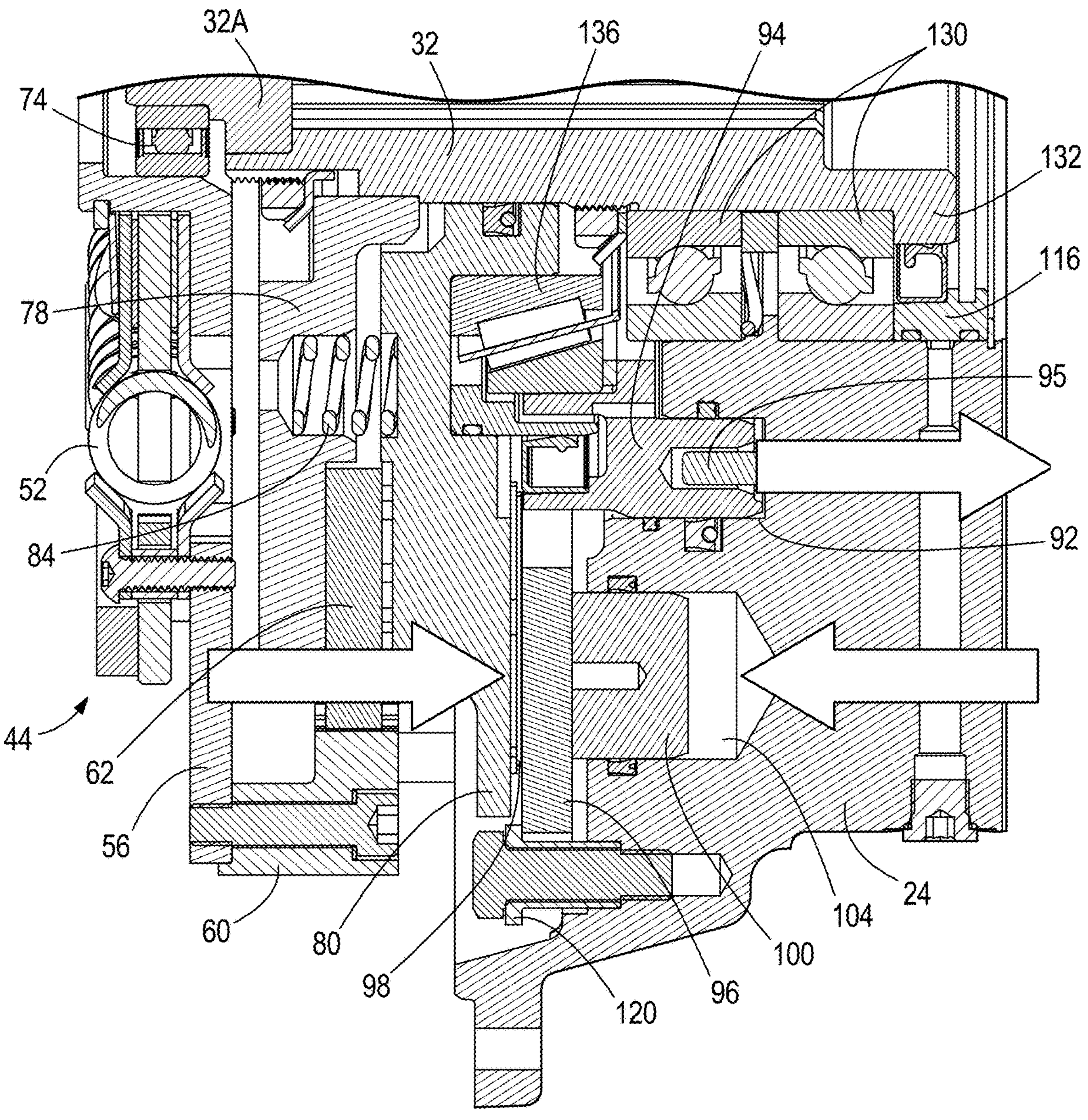
FIG. 11 is a detail view of the cross-section of the clutch, showing a third state in which the clutch is disengaged. The pressure plate is in the released position, in contact with the brake reaction plate and out of contact with the friction disc. Brake force is applied to the pressure plate and the output shaft by the clutch return springs.

As will be appreciated, hydraulic fluid supplied at sufficient pressure to any/all of the brake ports 40A, 40B, 40C will be transmitted to all the brake enable fluid chambers 104 to move the brake reaction plate 96 to the enabled position of FIGS. 10 and 11. The enabled position of the brake reaction plate 96 is defined by one or more stops 120 (FIGS. 3 and 6). The stops 120 can be provided in a distributed array around an outer perimeter of the brake reaction plate 96. The stops 120 can be threaded into an interior side of the bellhousing 24. The stops 120 as illustrated also extend at least partially through the brake reaction plate 96 to act as torque pins that resist rotation of the brake reaction plate 96 with respect to the bellhousing 24 when the rotating pressure plate 80 is pressed into the brake reaction plate 96. The hydraulic fluid pressure sufficient to move the brake reaction plate 96 to the enabled position is that which generates a force exceeding that of the brake reaction plate biasing member(s) 124, which may also be referred to as "brake springs." The biasing members 124 (FIGS. 4 and 6) can be provided in a distributed array around an outer perimeter of the brake reaction plate 96. The biasing members 124 can include coil springs provided on posts 126 threaded into an interior side of the bellhousing 24. The posts 126 may act as torque pins for securing the brake reaction plate 96 against rotation, similar to the stops 120. It is also noted that the hydraulic fluid pressure at the brake enable fluid chambers 104 is sufficient to withstand the additional force applied by the clutch springs 84 when the pressure plate 80 is released to press the braking surface thereof against the brake reaction plate 96 for braking (i.e., without the brake reaction plate 96 being forced back to the disabled position).

In addition to the bearing 74 at the end portion 32A of the output shaft 32, the clutch 20 includes a plurality of additional bearings that provide rolling interfaces for relative rotation of adjacent parts with low friction. As noted earlier, the bearing 74 is generally at the input side of the clutch 20. Adjacent the output side of the clutch 20, there are one or more bearings 130 situated between the output shaft 32 and the opening 28 in the bellhousing 24. The bearings 130 can include angular contact ball bearings as shown. The bearings 130 can be secured axially against a shoulder or flange 132 of the output shaft 32. A thrust bearing 136 is situated between the pressure plate 80 and the clutch piston 94. In the illustrated construction, the thrust bearing 136 between the pressure plate 80 and the clutch piston 94 is a tapered roller bearing having inner and outer races with roller-supporting raceway surfaces oriented at a skew angle with respect to the central axis A. The thrust bearing 136 is configured to move back and forth with the pressure plate 80 in response to movement of the clutch piston 94.

Figure 9:
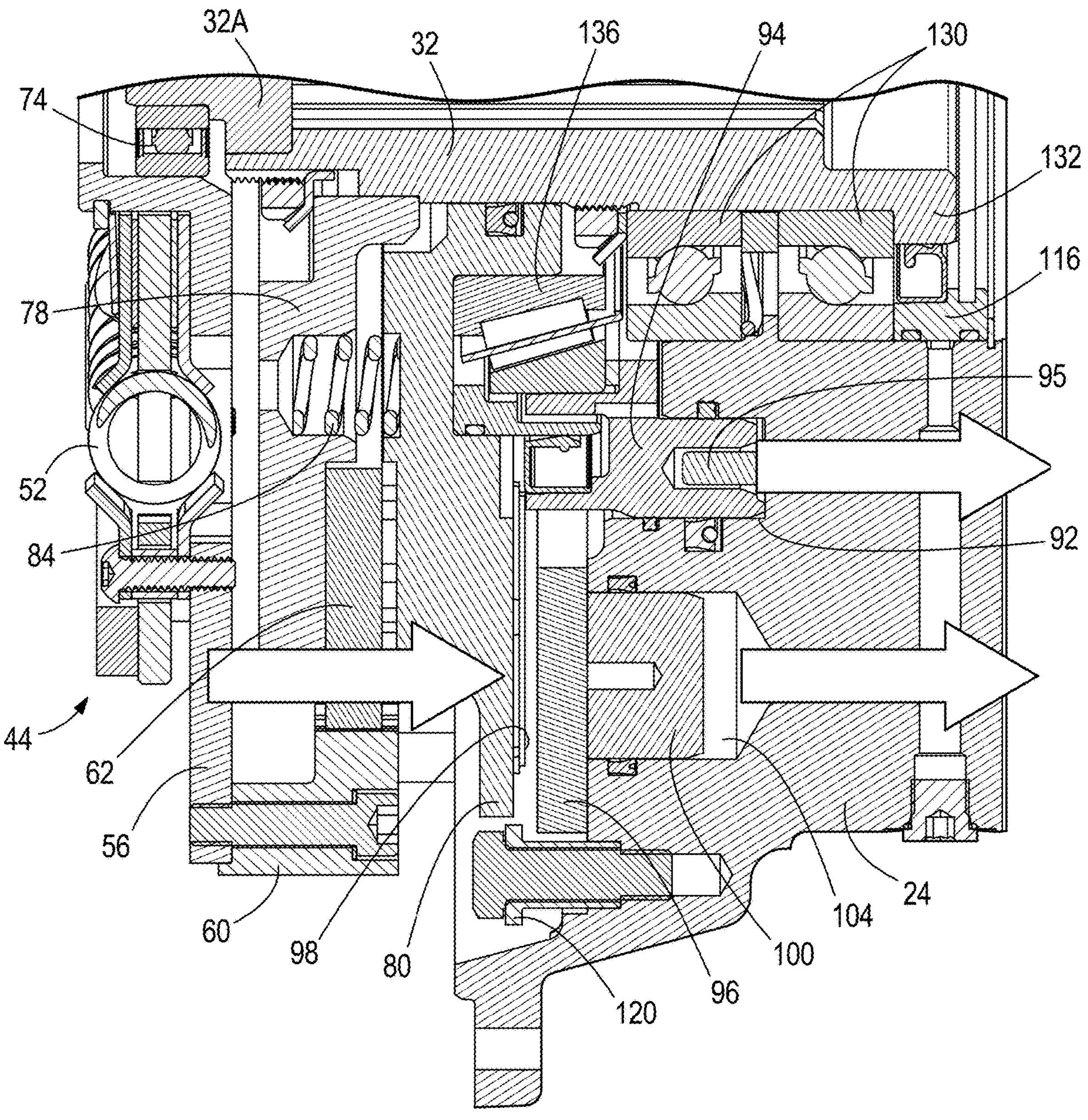
FIG. 9 is a detail view of the cross-section of the clutch, showing a first state in which the clutch is disengaged. The pressure plate is in a released position, out of contact with the friction disc. The brake reaction plate is in a disabled or service position, out of contact with the pressure plate such that the brake reaction plate allows free rotation of the pressure plate and output shaft.

A method of operating the clutch 20, including transitions among its various states, is described further with reference to FIGS. 9-11. The clutch 20 is shown in FIG. 9 as disengaged, or in other words, in a non-torque-transmitting state. Rotation of the input drive portion 44 is not imparted through the clutch 20 to the output shaft 32. Moreover, FIG. 9 may be considered the at-rest or natural state of the clutch 20, or the disengaged/unbraked state, as neither the clutch actuation fluid chamber 92 nor the brake enable fluid chamber 104 is activated by hydraulic fluid pressure. As such, the clutch and brake pistons 94, 100 are both in their respective unactuated positions. The pressure plate 80 is in its released position, out of contact with the friction disc 62, under the force from the clutch springs 84. Likewise, the brake reaction plate 96 is in the disabled position, under the force from the springs 124, out of contact with the pressure plate 80. In the state of FIG. 9, the pressure plate 80 is free from the hydraulically-induced braking force that the clutch 20 is capable of applying. The output shaft 32, like the pressure plate 80, is free to be rotated (e.g., via manual engagement of a downstream connected shaft or implement). This state enables simple service or maintenance without separate procedures to release the braking force, other than ceasing the hydraulic actuation.

FIG. 10 illustrates a state of the clutch 20 when both the clutch actuation fluid chamber 92 and the brake enable fluid chamber 104 are activated by hydraulic fluid pressure to advance the respective clutch and brake pistons 94, 100 to their actuated positions. The clutch piston 94 is moved to overcome the biasing force of the clutch springs 84 and press the pressure plate 80 onto the friction disc 62 so that the friction disc 62 is clamped between the end plate 78 and the pressure plate 80. This establishes the torque-transmitting state whereby rotation of the input drive portion 44 is imparted through the clutch 20 to the output shaft 32. The brake reaction plate 96 is in the enabled position, overcoming the force from the brake springs 124, although it remains out of contact with the pressure plate 80 since the pressure plate 80 is advanced to its engaged position. FIG. 10 can be considered the engaged/brake-ready state of the clutch 20. From the state of FIG. 10, the clutch 20 is transitioned to the state of FIG. 11 by (e.g., the sole action of) reducing or ceasing the fluid pressurization of the clutch actuation fluid chamber 92. As a result, brake force is automatically applied in response to clutch disengagement. No separate action is required to apply brake force within the clutch 20, and the brake force acts to begin braking the output shaft 32 and connected downstream shaft(s) and/or implement(s) as soon as the pressure plate 80 returns to the released position by the clutch springs 84. FIG. 11 illustrates the disengaged/braked state of the clutch 20. The brake friction between the pressure plate 80 and the brake reaction plate 96 can be configured to reduce the output shaft speed to zero or below another prescribed speed within a prescribed amount of time after the pressure drop in the clutch actuation fluid chamber 92. As long as the brake enable fluid chamber 104 remains pressurized, the output shaft 32 and connected downstream shaft(s) and/or implement(s) are held fixed.

Figure 12:
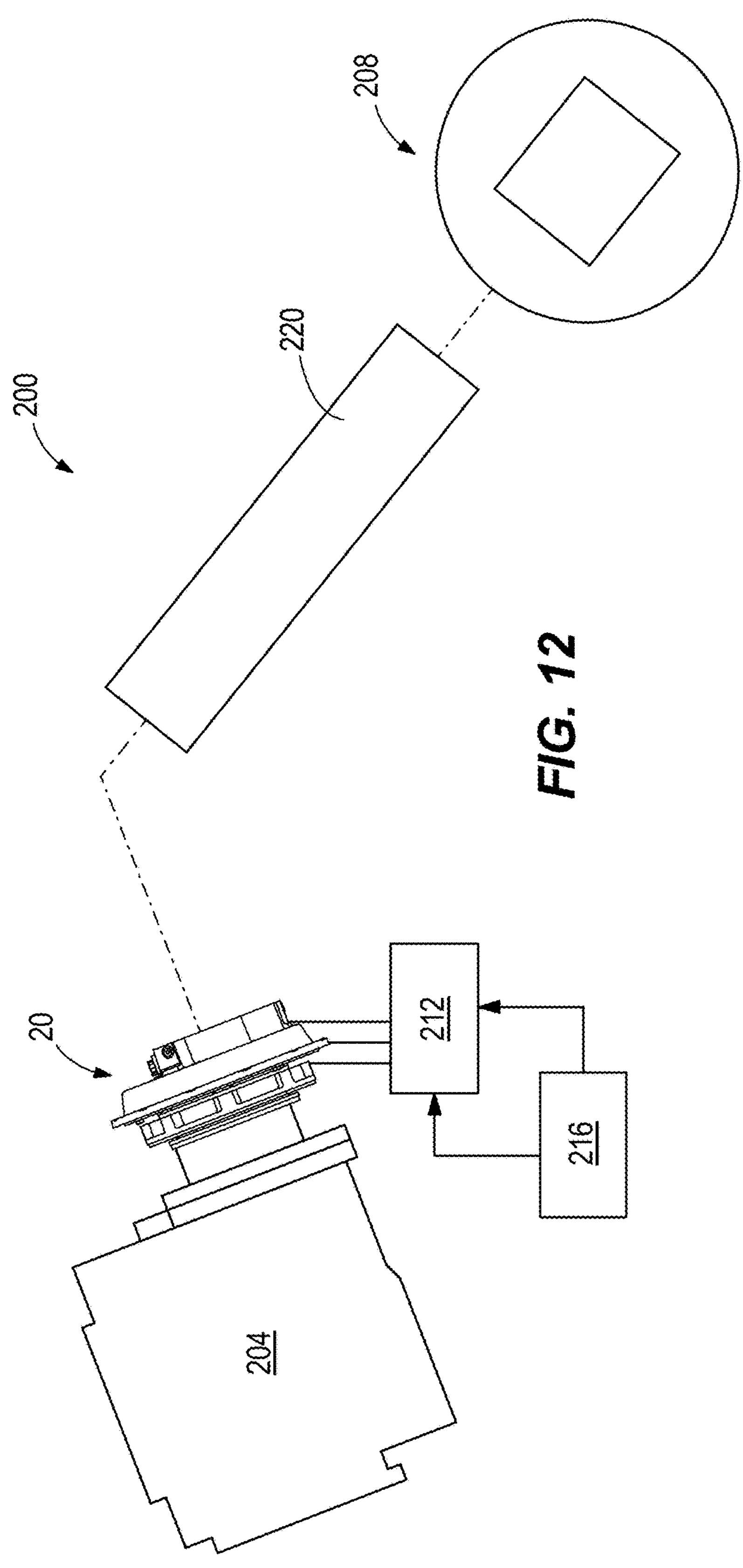
FIG. 12 is a schematic view showing an exemplary implementation of the clutch between an engine and a rotating implement.

Although not required in all constructions, the clutch 20 may advantageously be configured to change among the various states by the selectively supply of fluid pressure from a single source at a single actuation pressure. In other words, pressurized fluid supply is selectively turned "ON" or "OFF" to the clutch actuation fluid chamber 92 and the brake enable fluid chamber 104, individually as desired to achieve the various states. FIG. 12 schematically illustrates the clutch 20 in an exemplary system or machine 200, with the clutch 20 being located between an input side power source 204 (e.g., diesel engine) and an output side drivetrain 220 to an implement or tool 208 (e.g., cutting wheel). The machine 200 includes a valve block 212 having multiple fluid connections to the clutch 20. For example, the valve block 212 can have ports coupled to the clutch port 36, the drain port 38, and the brake port 40A, respectively. The valve block 212 (the construction and operation of which are not the subject of the present disclosure) can selectively apply hydraulic fluid pressure to the clutch actuation fluid chamber 92 and/or the brake enable fluid chamber 104. The valve block 212 can be controlled manually by an operator or through computer control. The valve block 212 communicates with a hydraulic fluid source 216 through a pressure or "SEND" line (e.g., via a pump in the hydraulic fluid source) and a drain or "RETURN" line. The drivetrain 220 from the clutch 20 to the tool 208, schematically shown in FIG. 12, can include a driveshaft, a belt, a chain, and/or one or more gearboxes. By assembling the machine 200 with the clutch 20 of the present disclosure, the drivetrain 220 and the rotating tool 208 downstream of the clutch 20 can be slowed and stopped automatically each time that the clutch 20 is disengaged (e.g., during continuous cycles of a normal work routine using the tool 208). The clutch 20 obviates the need for a separate dedicated braking system (e.g., at or near the tool 208), and the clutch 20 obviates the need for repetitive cycling of a brake actuation signal each time the clutch 20 is disengaged and braking force is desired. As noted above, the brake reaction plate 96 is maintained in a ready or standby position (FIG. 10) that enables braking force to be applied to the drivetrain as soon as the clutch pressure plate 80 returns to the released position to which it is biased.

Although the invention has been described in detail with reference to certain preferred embodiments, variations and modifications exist within the scope and spirit of one or more independent aspects of the invention as described.

What is claimed is:

1. A clutch comprising:

a housing;

an input drive portion and an output portion configured for selective connection to the input drive portion through a clutch pack for mutual rotation about a central axis;

a clutch actuation fluid chamber in the housing containing a movable clutch piston configured to selectively engage the clutch pack to connect the input drive portion and the output portion;

a brake reaction plate provided within the housing and configured for selective frictional braking of the output portion of the clutch; and a brake enable fluid chamber in the housing containing a movable brake piston configured to selectively move the brake reaction plate from a disabled position to an enabled position, wherein the clutch has a first state in which the clutch pack is disengaged and the brake reaction plate is in the disabled position such that frictional braking of the output portion of the clutch is not applied, wherein the clutch has a second state in which the clutch pack is engaged and the brake reaction plate is in the enabled position, without frictional braking of the output portion of the clutch being applied, and wherein the clutch has a third state in which the clutch pack is disengaged and the brake reaction plate is in the enabled position such that frictional braking of the output portion of the clutch is applied.

2. The clutch of claim 1, further comprising a brake bias member configured to urge the brake reaction plate to the disabled position.

3. The clutch of claim 2, further comprising a fixed stop against which the brake reaction plate is received when actuated to the enabled position.

4. The clutch of claim 3, further comprising a plurality of torque pins configured to secure the brake reaction plate against rotation with respect to the housing.

5. The clutch of claim 4, wherein the plurality of torque pins are provided by one or both of: the fixed stop and a post on which the brake bias member is provided.

6. The clutch of claim 1, wherein the brake enable fluid chamber is one of a plurality of brake enable fluid chambers in the housing, and the movable brake piston is one of a plurality of movable brake pistons, wherein an annular fluid channel in the housing interconnects the plurality of brake enable fluid chambers.

7. The clutch of claim 6, wherein the housing includes a plurality of external ports connected to the annular fluid channel.

8. The clutch of claim 1, wherein the clutch pack includes an end plate, a friction disc, and a pressure plate movable between a release position in which the friction disc is not clamped between the end plate and the pressure plate and an engaged position in which the friction disc is clamped between the end plate and the pressure plate, wherein the pressure plate has a clutching surface facing the friction disc and a braking surface facing the brake reaction plate.

9. The clutch of claim 8, further comprising an output shaft fixed for rotation with the end plate and rotatable with the end plate to provide the output portion of the clutch.

10. The clutch of claim 9, wherein the input drive portion includes a torsional coupling configured to damp torque pulses and drive the friction disc, wherein the torsional coupling is supported on the output shaft by a bearing.

11. The clutch of claim 10, wherein the torsional coupling and the bearing lie in a shared reference plane that extends perpendicular to the central axis.

12. The clutch of claim 11, wherein the torsional coupling is supported by the bearing on an end portion of the output shaft that is formed separately from a hollow main portion of the output shaft.

13. The clutch of claim 8, wherein the braking surface of the pressure plate is provided by a plurality of individual friction pads.

14. The clutch of claim 1, wherein the brake reaction plate and the clutch piston lie in a shared reference plane that extends perpendicular to the central axis.

15. A clutch comprising:

a housing;

an output shaft rotatably supported within the housing;

an input drive portion configured for selective connection to the output shaft through a clutch pack for mutual rotation about a central axis, wherein the input drive portion includes a friction disc and a torsional coupling configured to damp torque pulses and drive the friction disc, wherein the torsional coupling includes an output member driven through one or more elastic members and fixedly secured to the friction disc;

a bearing supporting the output member of the torsional coupling on the output shaft, wherein the torsional coupling of the input drive portion and the bearing lie in a shared reference plane that extends perpendicular to the central axis;

a clutch actuation fluid chamber in the housing, wherein a pressure plate of the clutch pack is configured for selective actuation to an engaged position that engages the clutch pack in response to fluid pressure in the clutch actuation fluid chamber; and a brake reaction disc selectively engageable by the pressure plate when the pressure plate is biased from the engaged position to a released position, wherein the brake reaction disc is movable from a disabled position to an enabled position in response to fluid pressure in a brake enable fluid chamber.

16. The clutch of claim 15, wherein the brake enable fluid chamber is one of a plurality of brake enable fluid chambers connected in fluid parallel with each other.

17. The clutch of claim 15, wherein the torsional coupling is supported by the bearing on an end portion of the output shaft that is formed separately from a hollow main portion of the output shaft.

18. A clutch comprising:

an end plate;

a housing;

a clutch actuation fluid chamber in the housing containing a movable clutch piston;

a pressure plate movable between a release position and an engaged position, the pressure plate having a clutching surface and a braking surface opposite the clutching surface, wherein the pressure plate is secured for rotation about a central axis with the end plate and an output shaft;

a friction disc positioned between the end plate and the clutching surface of the pressure plate and selectively clamped therebetween to engage the clutch, wherein the pressure plate is urged by a first bias member away from the end plate and the friction disc to the release position, and the pressure plate is configured for selective actuation to the engaged position in which the bias member is overcome in response to fluid pressure on the clutch piston; and a brake reaction plate positioned adjacent the braking surface of the pressure plate, the brake reaction plate having an enabled position and a disabled position, the brake reaction plate being biased by a second bias member to the disabled position, wherein, in the enabled position, the brake reaction plate is positioned to selectively receive the braking surface of the pressure plate in its release position to apply braking force configured to stop rotation of the pressure plate, the end plate, and the output shaft, and wherein, in the disabled position, the brake reaction plate is positioned away from the braking surface of the pressure plate in its release position to avoid applying braking force to the pressure plate.

* * * * *